United States Patent
Vedsted (10) Patent No.: US 9,826,749 B2
(45) Date of Patent: *Nov. 28, 2017

(54) SHRIMP PROCESSING APPARATUS AND METHODS

(71) Applicant: Laitram, L.L.C., Harahan, LA (US)

(72) Inventor: Lars Vedsted, Vadum (DK)

(73) Assignee: Laitram, L.L.C., Harahan, LA (US)

( * ) Notice: Subject to any disclaimer, the term of this patent is extended or adjusted under 35 U.S.C. 154(b) by 25 days.

This patent is subject to a terminal disclaimer.

(21) Appl. No.: 14/452,593

(22) Filed: Aug. 6, 2014

(65) Prior Publication Data
US 2015/0044952 A1     Feb. 12, 2015

Related U.S. Application Data

(60) Provisional application No. 61/862,552, filed on Aug. 6, 2013.

(51) Int. Cl.
*A22C 29/02* (2006.01)
*A22C 17/00* (2006.01)

(52) U.S. Cl.
CPC .......... *A22C 29/024* (2013.01); *A22C 17/008* (2013.01); *A22C 29/026* (2013.01); *A22C 29/028* (2013.01)

(58) Field of Classification Search
CPC ..... A22C 29/02; A22C 29/024; A22C 29/026; A22C 29/028
USPC .............................................. 452/1, 2, 4, 5, 8
See application file for complete search history.

(56) References Cited

U.S. PATENT DOCUMENTS

| 2,778,055 A | | 1/1957 | Lapeyre et al. | |
|---|---|---|---|---|
| 4,222,153 A | * | 9/1980 | Schmidt | A22C 29/028 452/5 |
| 4,251,902 A | * | 2/1981 | Grinberg | A22C 29/026 452/15 |
| 4,307,492 A | * | 12/1981 | Braginsky | A22C 29/026 452/5 |
| 4,387,485 A | * | 6/1983 | Grinberg | A22C 29/026 452/8 |
| 4,517,707 A | * | 5/1985 | Braginsky | A22C 29/026 452/5 |
| 4,639,976 A | * | 2/1987 | Hansen | A22C 29/026 452/5 |
| 4,692,965 A | | 9/1987 | Stephenson | |
| 4,769,870 A | * | 9/1988 | Hansen | A22C 29/025 452/5 |

(Continued)

OTHER PUBLICATIONS

International Search Report and Written Opinion of the International Searching Authority, PCT/US2014/049844, dated Nov. 21, 2014, Korean Intellectual Property Office, Republic of Korea.

*Primary Examiner* — David Parsley
(74) *Attorney, Agent, or Firm* — James T. Cronvich (57) ABSTRACT

Apparatus and methods for deheading and peeling shrimp hydraulically using the Venturi Effect. A shrimp-laden fluid is pumped through a conduit system including one or more venturi tubes. The acceleration of the fluid through the venturis detaches the heads and loosens or detaches the shells from the shrimp. The venturis may be used in conjunction with a roller peeler to increase peeling quality. An inspection station receives shrimp from the roller peeler and directs incompletely peeled shrimp back to the peeler or one or more of the venturis.

18 Claims, 7 Drawing Sheets

(56) References Cited

U.S. PATENT DOCUMENTS

| | | | |
|---|---|---|---|
| 5,108,342 A | | 4/1992 | Lapeyre et al. |
| 5,195,921 A | | 3/1993 | Ledet |
| 6,099,400 A | * | 8/2000 | Ragnarsson ......... A22C 29/026 |
| | | | 452/2 |
| 6,488,576 B1 | | 12/2002 | Shelton |
| 6,808,448 B1 | | 10/2004 | Kanaya et al. |
| 7,357,706 B2 | * | 4/2008 | Hansen .................. A22C 29/02 |
| | | | 452/2 |
| 8,801,507 B2 | | 8/2014 | Vedsted et al. |

\* cited by examiner

SHRIMP PROCESSING APPARATUS AND METHODS

CROSS-REFERENCE TO RELATED APPLICATIONS

This application claims priority to U.S. Provisional Patent Application No. 61/862,552, filed Aug. 6, 2013, and incorporated entirely by reference into this specification.

BACKGROUND

The invention relates generally to shellfish processing and more particularly to apparatus and methods for removing the heads and shells from shrimp.

Originally introduced because of the high labor costs of peeling small shrimp by hand, shrimp-peeling machines are now widely used in the shrimp-processing industry. Roller-type peeling machines, in particular, dominate the bulk shrimp-peeling industry. U.S. Pat. No. 2,778,055, Jan. 22, 1957, and U.S. Pat. No. 2,537,355, Jan. 9, 1951, describe the basic structure and principles of operation of roller-type shrimp peelers, which detach heads and shells from shrimp. But the fluids and slime squeezed from the heads of the shrimp coat the peeling rollers, which degrades their grip on the shrimp and peeling quality.

Figure 1A:
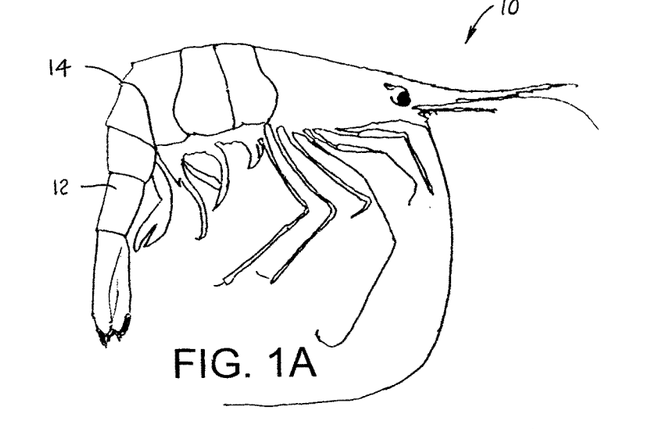
FIGS. 1A and 1B are side and top views of a shrimp.
Figure 1B:
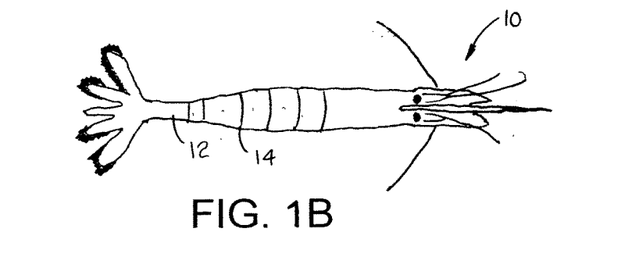

Deheading shrimp by hydrodynamic force is known from U.S. Pat. No. 5,195,921, Mar. 23, 1993. In that patent, a shrimp-laden fluid is pumped through conduit that abruptly narrows. The abrupt decrease in the cross-section of the conduit causes the flow to accelerate through the narrow cross section according to the Venturi Effect. Hydrodynamic forces caused by the change in cross-section tend to detach heads from shrimp. Because of the high-speed water flow and rollerless operation, the removal of heads is not degraded by shrimp fluids. As shown in FIGS. 1A and 1B, cold-water shrimp 10, for example, have a long, thin sixth segment 12 that is easy to damage. The joint 14 between the third and fourth segments is also susceptible to damage. The abrupt change in the cross-section of the conduit can cause shrimp to break at these and other weak spots.

Thus, there is a need for a shrimp-processing system that can dehead and shell shrimp without damaging shrimp meats.

SUMMARY

A system embodying features of the invention for processing shrimp comprises a hydraulic head detacher including one or more venturis that accelerate a flow of fluid carrying shrimp to subject the shrimp to turbulence detaching heads from the bodies of the shrimp. A peeler detaches shells, appendages, and residual heads from the headless shrimp bodies received from the hydraulic head detacher. An inspection station receives the shrimp bodies from the peeler and redirects those with residual shell or appendages back to the peeler.

In another aspect of the invention, a method for processing shrimp comprises: (a) detaching heads from the bodies of the shrimp by flowing a fluid carrying the shrimp bodies through one or more venturis; (b) peeling the headless shrimp bodies to remove the shells from the shrimp meat; and (c) inspecting the headless shrimp bodies for residual shell and appendages and repeating step (b) on headless shrimp bodies having residual shell or appendages.

In yet another aspect of the invention, a system for processing shrimp comprises a hydraulic head detacher and a hydraulic shell detacher. The head detacher includes one or more venturis that accelerate a flow of fluid carrying shrimp. The venturis subject the shrimp to turbulence that detaches heads from the bodies of the shrimp. A hydraulic shell detacher includes one or more venturis that accelerate a flow of water carrying headless shrimp to subject the shrimp to turbulence that detaches shell from the bodies of the shrimp received from the hydraulic head detacher.

In another aspect of the invention, a system for processing shrimp comprises a hydraulic shell detacher and an inspection station. The shell detacher includes one or more venturis that accelerate a flow of water carrying shrimp to subject the shrimp to turbulence that detaches shell from the bodies of the shrimp. The inspection station receives the shrimp bodies from the hydraulic shell detacher and redirects those shrimp bodies with residual shell or appendages back to the hydraulic shell detacher.

BRIEF DESCRIPTION OF THE DRAWINGS

These aspects and features of the invention are described in more detail in the following description, appended claims, and accompanying drawings, in which:

DETAILED DESCRIPTION

Figure 2:
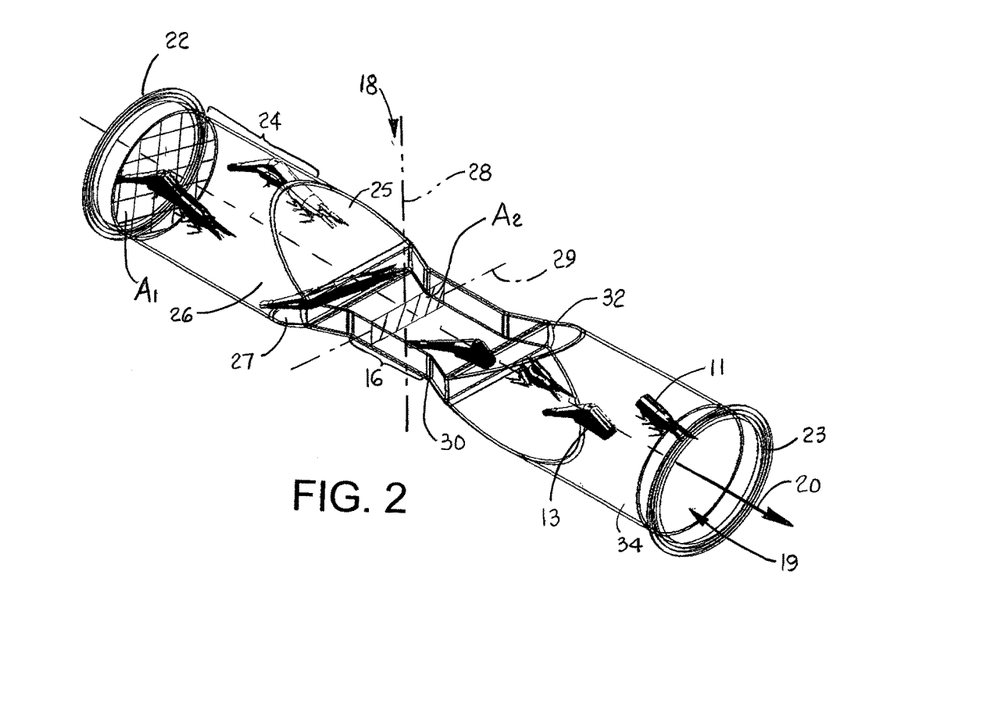
FIG. 2 is an isometric view of a venturi tube for a deheading apparatus embodying features of the invention.

A venturi tube, or venturi, usable in a shrimp-processing system embodying features of the invention is shown in FIG. 2. The venturi 16 is a restricted portion of a conduit 18 enclosing a fluid channel 19 conveying a shrimp-laden fluid along a fluid path 20. The conduit has an open entrance end 22 and an opposite open exit end 23 downstream of the entrance end. An input portion 24 of the conduit extends downstream from the entrance end 22 and defines the fluid channel with a cross-sectional area $A_1$.

A transition portion 26 of the conduit extends downstream from the input portion 24 to the venturi 16. The transition portion 26 defines a length of the fluid channel with a converging cross-sectional area formed by two pairs of converging parabolic walls: large walls 25 and small walls 27. The venturi 16 has a cross-sectional area $A_2$ that is less than that of the input portion 24. In the example of FIG. 2, the shape of the cross-sectional area $A_2$ of the venturi is rectangular, but may be other shapes, e.g., elliptical or oval, having a minor axis 28 shorter than its major axis 29. The venturi 16 extends downstream to an open end 30. In FIG.

2, the venturi's end 30 opens into a downstream transition portion 32 of the conduit defining a length of the fluid channel 19 diverging outward from the cross-sectional area $A_2$ of the venturi to a larger cross-sectional area of an output portion 34 of the conduit. In this example, the output portion 34 has the same cross-sectional area $A_1$ as the input portion 24. Thus, the conduit 18 in FIG. 2 is reversible. But the downstream transitional portion 32 may be eliminated and replaced with a flat plate having an opening forming an end wall of the output portion 34 at the open end 30 of the venturi 16.

Figure 3A:
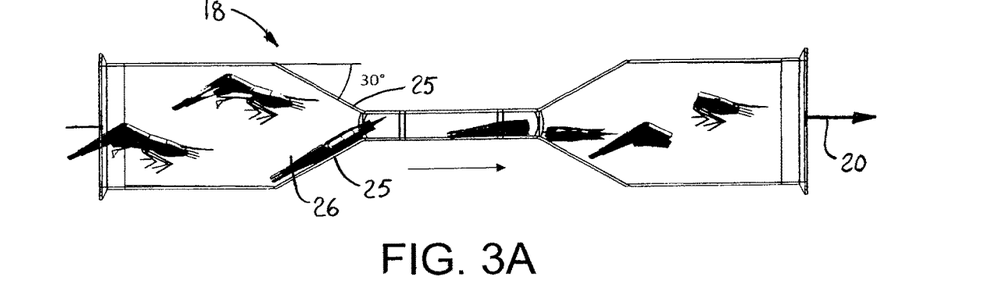
FIGS. 3A-3C are side views of a venturi tube as in FIG. 2 with a tapered transition region with taper angles of 30°, 45°, and 60°.
Figure 3B:
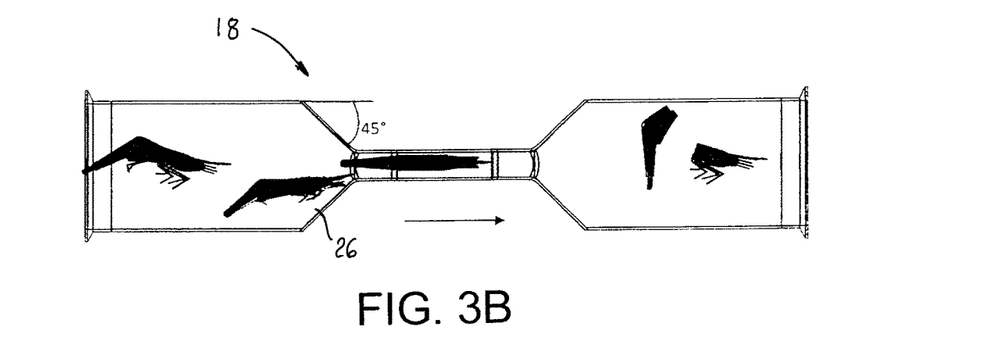
Figure 3C:
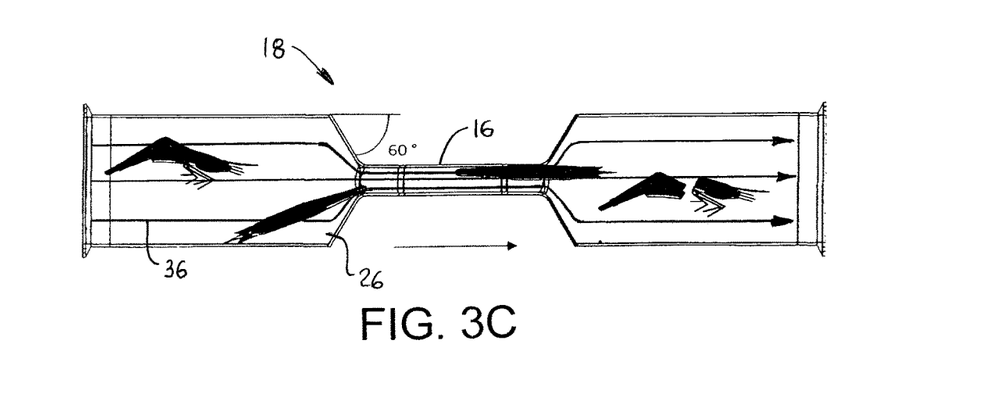

As shown in FIGS. 3A-3C, the transition portion of the conduit 18 may be gradual (FIG. 3A with a 30° taper of the long parabolic walls 25 relative to the direction of the fluid path 20 and a long length), sharp (FIG. 3C with a 60° taper of the long parabolic walls 25 and a short length), or intermediate (FIG. 3B with a 45° taper of the long parabolic walls 25 and an intermediate length). The sharp transition portion 26 of FIG. 3 causes a more abrupt acceleration of the fluid through the channel than the longer tapers of FIGS. 3A and 3B and is more useful for sturdier shrimp. As indicated by the convergence of streamlines 36 in the transition portion 26 of the conduit, the flow accelerates to a higher speed in the venturi 16. The converging flow tends to orient the shrimp along the streamlines by minimizing the surface area broadside to the flow. The hydrodynamic forces caused by the rapid acceleration of the flow at the venturi and by the non-uniformity of the flow just downstream of the venturi is sufficient to detach heads from the shrimp. The major axis 29 of the venturi cross-sectional area $A_2$ is long enough to admit a major portion of, if not all, the length of a shrimp into the venturi without severe collisions with the interior walls of the conduit that could break the shrimp between segments. For this reason, gradually tapered venturis are especially useful for deheading fragile cold-water shrimp. Sharper tapered venturis are useful not only for deheading shrimp, but also for peeling, or shelling, shrimp.

Figure 4A:
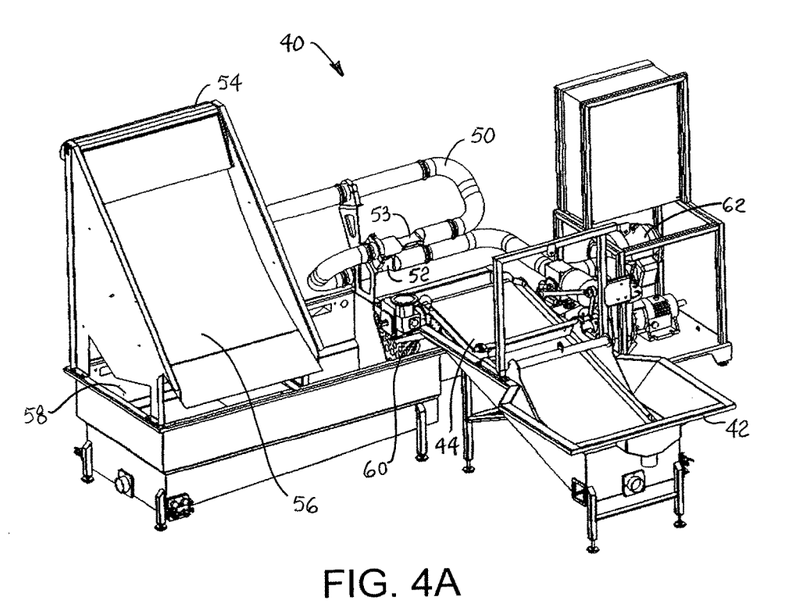
FIGS. 4A and 4B are front and rear isometric views of a deheading system including venturi tubes as in FIG. 2.
Figure 4B:
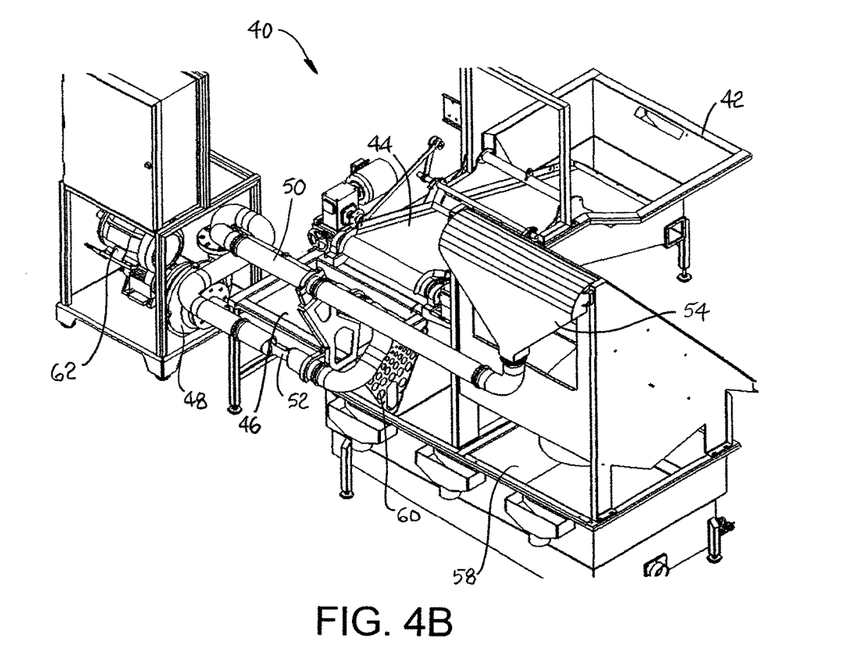

One version of a deheading system 40 is shown in FIGS. 4A and 4B. Shrimp are conveyed out of a feed tank 42 by a conveyor belt 44 and dropped into a fluid-filled trough 46. A food pump 48 draws shrimp-laden fluid from the trough 46 and pumps it into a conduit system 50, which has two venturis 52, 53 at spaced apart locations along its length. Shrimp are deheaded in the venturis and conveyed by the fluid through the conduit system to a feed plenum 54. The shrimp bodies and detached heads drop from the plenum onto a screen slide 56. The fluid drains through the screen and into a tank 58 in fluid communication with the trough 46. A perforated plate 60 between the tank and the trough prevents shrimp in the trough from entering the tank 58. The food pump 48 is driven by a pump motor 62. Together, the pump and the motor form flow control means that controls the flow rate and the fluid speed through the conduit system. The deheading system can also be used to loosen or detach shells and appendages from the shrimp.

Figure 5:
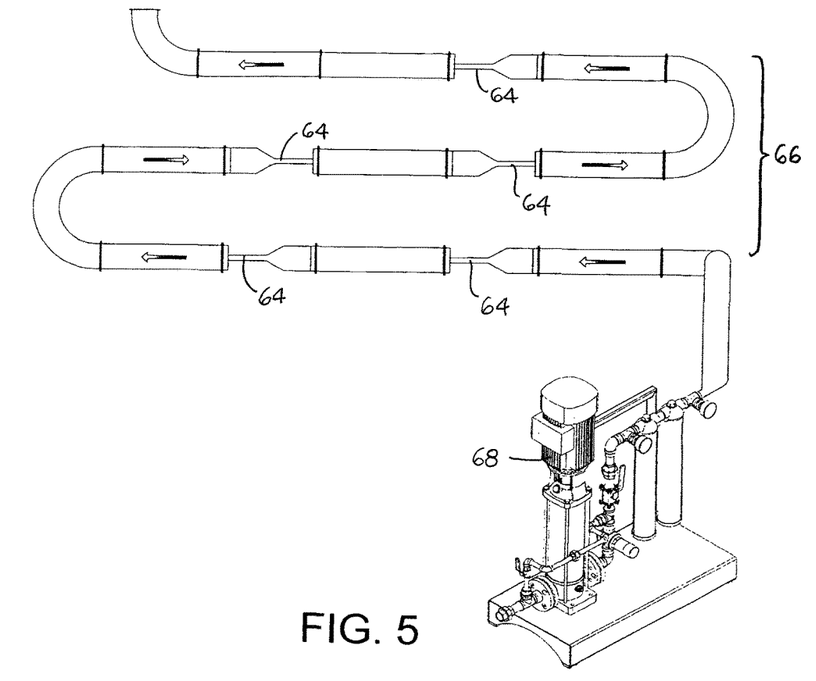
FIG. 5 is a schematic diagram of a multi-venturi deheading system using venturis as in FIG. 2.
Figure 6:
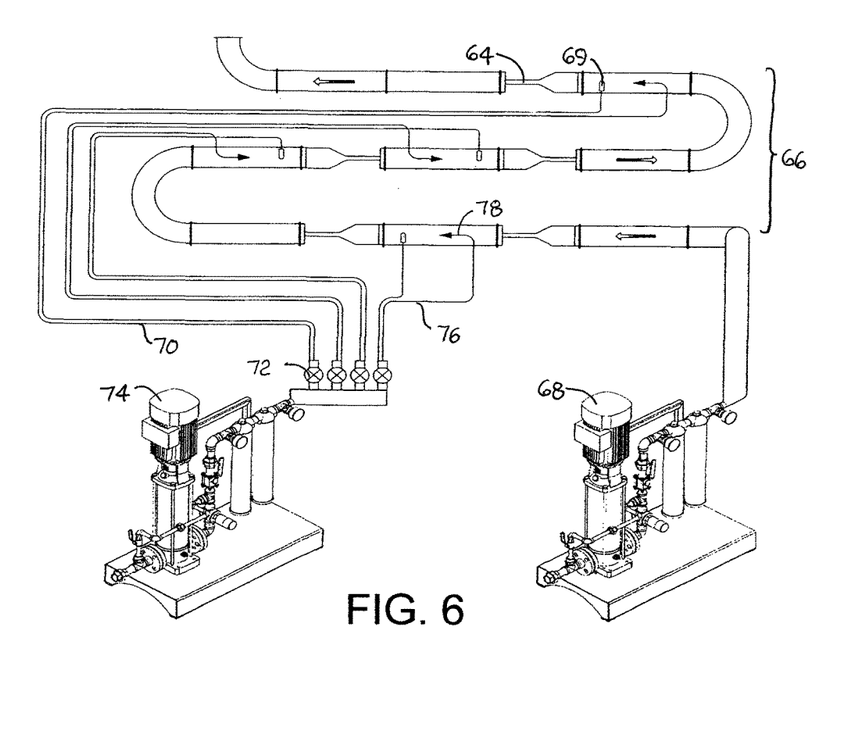
FIG. 6 is a schematic diagram of a multi-venturi deheading system as in FIG. 5 including an additional boost pump.

The deheading and shelling system shown in FIG. 5 has five venturis 64 cascaded in series in a conduit system 66. A food pump 68 induces a flow through the conduit system 66. Such a multiple-venturi system can be effective for deheading and shelling shrimp. The deheading and shelling system of FIG. 6 adds fluid-pressure sensor 69 at sensor locations in the conduit system 66, for example, at locations just upstream of the final four venturis 64 to measure the hydrodynamic force of the flow. The outputs 70 of the pressure sensors control valves 72 connected between a boost pump 74 and fluid lines 76 injecting fluid into the conduit system at injection locations 78 near the sensor locations, for example, to replace any leaked fluid and to maintain the fluid pressure along the length of the fluid channel.

Figure 7:
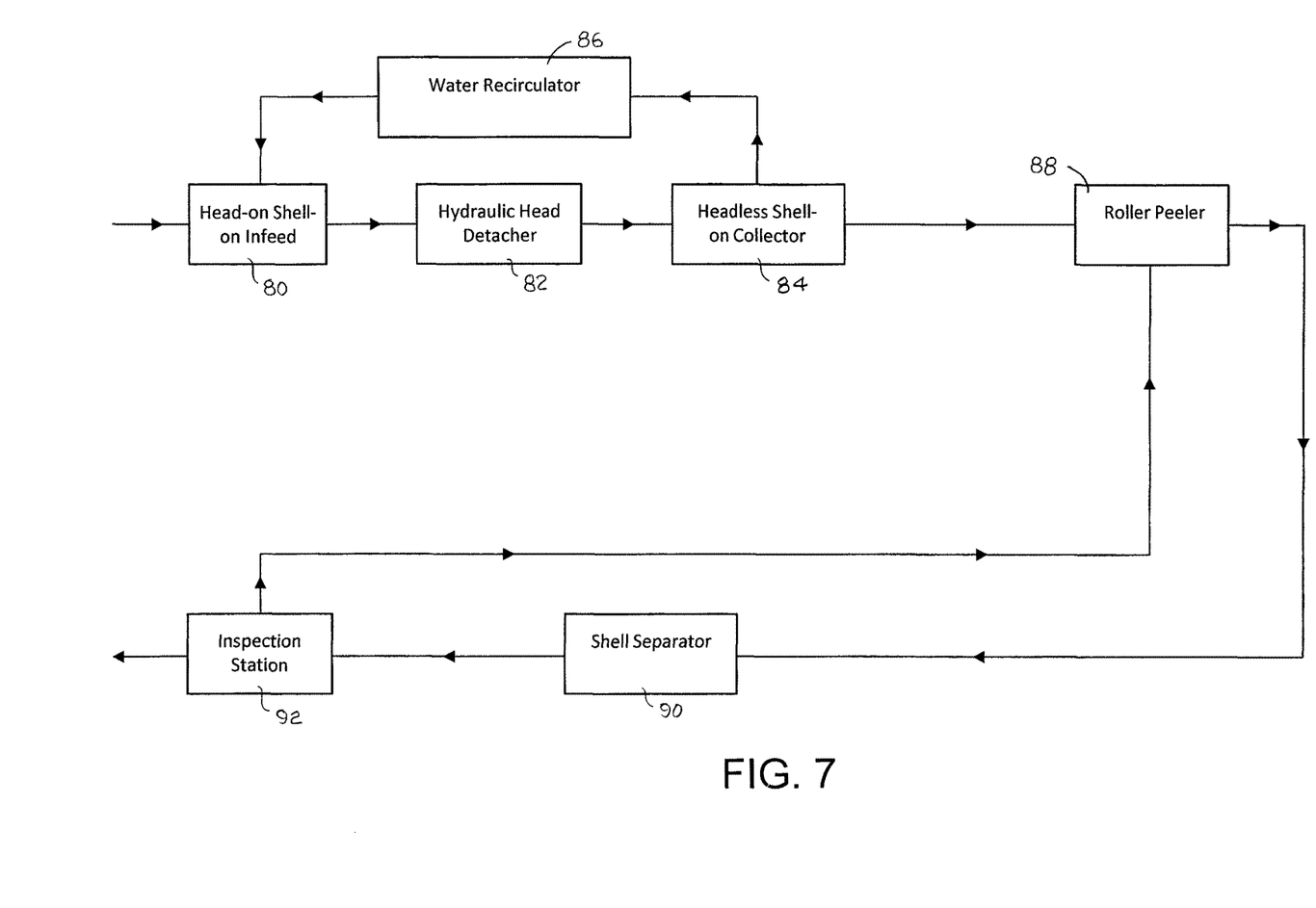
FIG. 7 is a block diagram of one version of a shrimp-processing system embodying features of the invention including a venturi head detacher and a roller peeler.

One version of a shrimp-processing system embodying features of the invention is shown in FIG. 7. An infeed system 80 feeds raw head-on, shell-on shrimp to a hydraulic head detacher 82. The infeed system includes, for example, the feed tank 46 into which shrimp are conveyed, the food pump 48, and the conduit 50 of FIGS. 4A and 4B through which the food pump pumps a shrimp-laden fluid, such as water, in a continuous flow. The hydraulic head detacher 82 comprises a single venturi (52, FIG. 4A) or a cascade of venturis. As shown in FIG. 2, the venturi detaches the loosely connected heads 11 from the shrimp bodies 13.

The detached heads flow to a collector 84 that collects the headless shrimp bodies and the detached heads conveyed through connecting conduit from the head detacher 82. One example of a collector includes the feed plenum 54 and the screen slide 56 of FIGS. 4A and 4B. A conveyor 124 transports the detached heads and shrimp bodies to a roller peeler 88. An optional water recirculator 86, which includes filters or other water treatment components such as the screen 56, the tank 58, the perforated plate 60, and the feed pump 48 of FIGS. 4A and 4B and inlet valves to admit fresh water to replenish lost fluid, recirculates the filtered spent fluid back into the flow at the front end of the head detacher 82. The roller peeler 88, which may be a Laitram® Model A peeler manufactured and sold by Laitram Machinery, Inc., removes the shells from the headless shrimp bodies and discards the shells along with the detached heads. The head detachment may be performed at the same location as the peeling or at different geographical locations. For example, the heads may be detached geographically close to where the shrimp are caught so that the headless shrimp can be shipped to a peeling operation for less cost because of the lower weight of headless shrimp and with less chance of spoilage because of the removal of head organs and fluids.

The peeled shrimp are conveyed to a shell separator 90, which includes one or more cleaners or roller separators interconnected by conveyors or flumes. The shell separator separates loosened and detached shell and appendages from the peeled shrimp meats, which are conveyed to an inspection station 92. The inspection station 92 may include a machine-vision accept-reject sorter or be a manned inspection station in which shrimp with residual shell or appendages are sorted from the accepted peeled shrimp meats. Rejected shrimp are conveyed back to the roller peeler 88 for re-processing.

Figure 8:
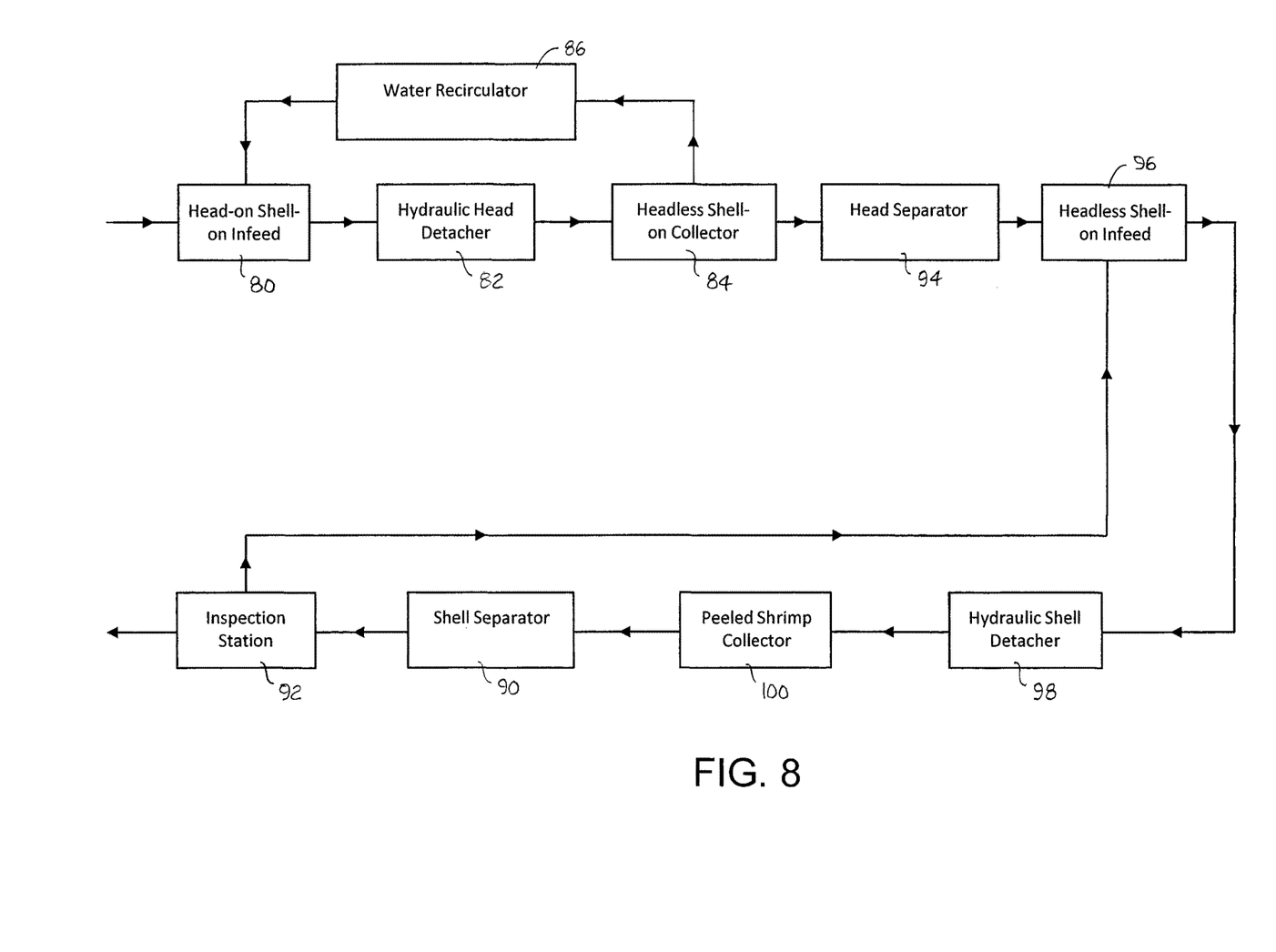
FIG. 8 is a block diagram of a second version of a shrimp-processing system embodying features of the invention including venturi head and shell detachers.

Another version of a shrimp-processing system is shown in FIG. 8, in which the roller peeler 88 of FIG. 7 is replaced by a hydraulic shell-removal system. The shrimp are deheaded as in FIG. 7. The headless shrimp bodies exiting the headless shell-on collector 84 are conveyed to a head separator 94, which can be an air separator or a manual inspection station. The headless shrimp bodies are culled from the detached heads and transported to a second infeed system 96.

Like the first infeed system 80, the second infeed system 96 can include a feed tank, in which the headless shrimp with loosened shell and appendages are accumulated, a food pump for entraining the shrimp in a fluid flow through a conduit leading to another hydraulic detacher 98 that is used to detach shell and appendages from the headless shrimp bodies. The hydraulic shell detacher 40 is similar to the hydraulic head detacher 82. The number of venturis, their velocity gradients, and their flow rates can all be tailored to detach shell and appendages without damaging the peeled shrimp meat.

The peeled shrimp are collected in a peeled shrimp collector 100. Like the headless, shell-on collector 84 downstream of the hydraulic head detacher 82, the peeled shrimp collector 100 can include a water removal screen, a collection tank, and an outfeed conveyor 44. A water recirculator (not shown) may be used with the shell detacher and separator. The peeled shrimp collector drains the water from the shrimp meat and the detached shell and appendages. The shrimp meat and the detached shell and appendages are transported to the shell separator 90, which separates the shrimp meat from the detached shell and appendages. The headless, shelled shrimp bodies are then sent to the inspection station 92. Rejected shrimp with residual shell or appendages are returned to the headless shrimp infeed 96 for another pass through the hydraulic shell detacher 98.

Figure 9:
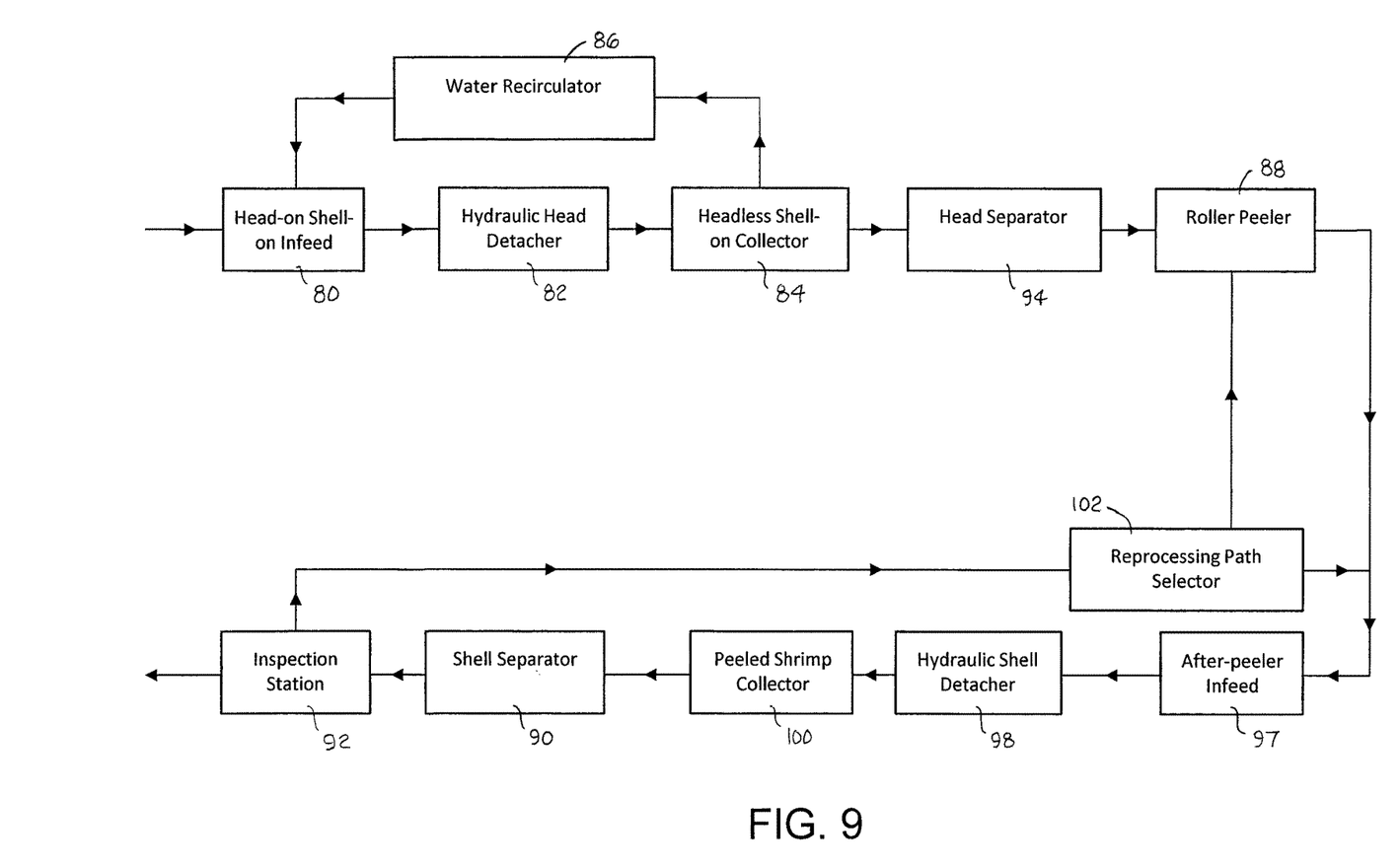
FIG. 9 is a block diagram of a third version of a shrimp-processing system having features of FIGS. 7 and 8 and a reprocessing path selector.

FIG. 9 shows a shrimp-processing system with a roller peeler 88 followed by a hydraulic shell detacher 98. Headless, peeled shrimp exiting the roller peeler 88 are conveyed to an after-peeler infeed 97 like the first infeed 80 and the second infeed 96 in the processing system of FIG. 8. The headless, peeled shrimp are then subjected to further hydraulic shell detachment and separation in the shell detacher 98, the peeled shrimp collector 100, and the shell separator 90. The processed shrimp meats are conveyed to the inspection station 92. The rejected shrimp with residual material are optionally returned to the system for reprocessing. A reprocessing path selector 102 directs the rejected shrimp back into the roller peeler 88 or to the infeed 97 to the hydraulic shell detacher 98 depending on the amount of residual material on each processed shrimp.

What is claimed is:

1. A system for processing shrimp comprising:
 a hydraulic head detacher including one or more venturis accelerating a flow of fluid carrying shrimp to subject the shrimp to turbulence detaching heads from the bodies of the shrimp;
 a peeler for detaching shells, appendages, and residual heads from the headless shrimp bodies received from the hydraulic head detacher;
 a conveyor conveying all the shrimp bodies processed by the peeler along a single conveying path; and
 an inspection station including a visioning system that receives all the shrimp bodies on the single conveying path before inspection and then inspects all the shrimp bodies received from the conveyor on a single inspection path, the inspection station redirecting shrimp bodies identified by the visioning system to have residual shell or appendages back to the peeler.

2. A system as in claim 1 further comprising a shell separator receiving the headless shrimp bodies from the peeler and separating the detached shell and appendages from the shrimp bodies.

3. A system as in claim 1 further comprising a head separator receiving the headless shrimp bodies and the detached heads from the hydraulic head detacher and separating the headless shrimp bodies from the detached heads.

4. A system as in claim 1 further comprising a first collector collecting the detached heads and shrimp bodies from the flow of water exiting the hydraulic head detacher.

5. A system as in claim 1 wherein the peeler is a roller peeler.

6. A system as in claim 1 wherein the peeler comprises a hydraulic shell detacher including one or more venturis accelerating a flow of water carrying headless shrimp to subject the shrimp to turbulence detaching shell from the bodies of the shrimp.

7. A system as in claim 6 further comprising a first collector collecting the detached heads and shrimp bodies from the flow of water exiting the hydraulic head detacher and a second collector collecting the detached shell, appendages, and shrimp bodies from the flow of water exiting the hydraulic shell detacher.

8. A system as in claim 1 further comprising a water recirculation system treating the fluid exiting the hydraulic head detacher and recirculating the treated fluid back through the hydraulic head detacher.

9. A system as in claim 1 wherein the hydraulic head detacher and the peeler are at different geographical locations.

10. A method for processing shrimp comprising:
 (a) detaching heads from the bodies of the shrimp by flowing a fluid carrying the shrimp bodies through one or more venturis;
 (b) subjecting the headless shrimp bodies to a peeling process to remove the shells from the shrimp meat;
 (c) conveying all the headless shrimp bodies subjected to the peeling process along a single conveying path to a single inspection path through a visioning system;
 (d) inspecting all the peeled headless shrimp bodies on the single inspection path for residual shell and appendages with the visioning system; and
 (e) repeating step (b) on headless shrimp bodies identified by the visioning system as having residual shell or appendages.

11. The method of claim 10 comprising peeling the headless shrimp bodies with a roller peeler.

12. The method of claim 10 comprising peeling the headless shrimp bodies by flowing a fluid carrying the shrimp bodies through a cascade of venturis.

13. The method of claim 10 further comprising shipping the headless shrimp bodies from a first geographical location where the heads are detached to a different second geographical location where the headless shrimp are peeled.

14. A system for processing shrimp comprising:
 a hydraulic head detacher including one or more venturis accelerating a flow of fluid carrying shrimp to subject the shrimp to turbulence detaching heads from the bodies of the shrimp;
 a hydraulic shell detacher including one or more venturis accelerating a flow of water carrying headless shrimp to subject the shrimp to turbulence detaching shell from the bodies of the shrimp received from the hydraulic head detacher;
 a conveyor conveying all the shrimp bodies processed by the hydraulic shell detacher along a single conveying path; and
 an inspection station including a visioning system that receives all the shrimp bodies on the single conveying path before inspection and then inspects all the shrimp bodies received from the conveyor on a single inspection path, the inspection station redirecting shrimp bodies identified by the visioning system to have residual shell or appendages back to the hydraulic shell detacher.

15. A system as in claim 14 further comprising a head separator receiving the headless shrimp bodies and the detached heads from the hydraulic head detacher and separating the headless shrimp bodies from the detached heads.

16. A system as in claim 14 wherein the hydraulic head detacher and the hydraulic shell detacher are at different geographical locations.

17. A system for processing shrimp comprising:
- a hydraulic shell detacher including one or more venturis accelerating a flow of water carrying shrimp to subject the shrimp to turbulence detaching shell from the bodies of the shrimp;
- a conveyor conveying all the shrimp bodies processed by the hydraulic shell detacher along a single conveying path; and
- an inspection station including a visioning system that receives all the shrimp bodies on the single conveying path before inspection and then inspects all the shrimp bodies received from the conveyor on a single inspection path, the inspection station redirecting shrimp bodies identified by the visioning system to have residual shell or appendages back to the hydraulic shell detacher.

18. A system as in claim 17 further comprising a hydraulic head detacher including one or more venturis accelerating a flow of fluid carrying head-on shrimp to subject the head-on shrimp to turbulence detaching heads from the bodies of the head-on shrimp to present headless shrimp bodies to the hydraulic shell detacher.

\* \* \* \* \*